United States Patent [19]
Masuda et al.

[11] Patent Number: 5,245,618
[45] Date of Patent: Sep. 14, 1993

[54] LASER BEAM GENERATING APPARATUS

[75] Inventors: Hisashi Masuda, Tokyo; Yushi Kaneda, Kanagawa, both of Japan

[73] Assignee: Sony Corporation, Japan

[21] Appl. No.: 865,135

[22] Filed: Apr. 8, 1992

[30] Foreign Application Priority Data

Apr. 9, 1991 [JP] Japan ............... 3-103979

[51] Int. Cl.$^5$ ............................... H01S 3/10
[52] U.S. Cl. ........................ 372/22; 372/21; 372/92; 372/105
[58] Field of Search ............ 372/22, 21, 92, 105, 372/106

[56] References Cited

U.S. PATENT DOCUMENTS

| | | | |
|---|---|---|---|
| 4,048,515 | 9/1977 | Liu | 372/105 |
| 4,910,740 | 3/1990 | Oka | 372/22 |
| 5,181,214 | 1/1993 | Berger et al. | 372/21 |

FOREIGN PATENT DOCUMENTS

0331303A3  9/1989  European Pat. Off.

Primary Examiner—James W. Davie
Attorney, Agent, or Firm—Philip M. Shaw, Jr.; Charles P. Sammut

[57] ABSTRACT

A laser beam generating apparatus which is easy to manufacture and simple in adjusting operation. The laser beam generating apparatus comprises a light source having a narrow active layer for generating pumping laser beam, a laser medium for receiving the pumping laser beam to form a heat lens therein and generate a fundamental wave laser beam, a non-linear optical crystal element having a face inclined with respect to an optical axis of the fundamental wave laser beam for receiving the fundamental wave laser beam to generate secondary harmonic laser beam, a quarter wavelength plate for suppressing coupling between two polarization modes of the fundamental wave laser beam, and a pair of planar reflecting means for reflecting the fundamental wave laser beam back into the laser medium. The laser medium, non-linear optical crystal element, quarter length plate and planar reflecting means cooperate to constitute a light resonator. The optical axis of the pumping laser beam is adjusted in a direction perpendicular to the optical axis.

9 Claims, 2 Drawing Sheets

F I G. 2
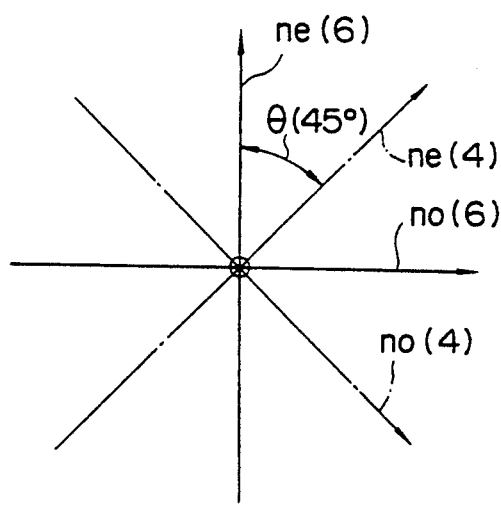
F I G. 3
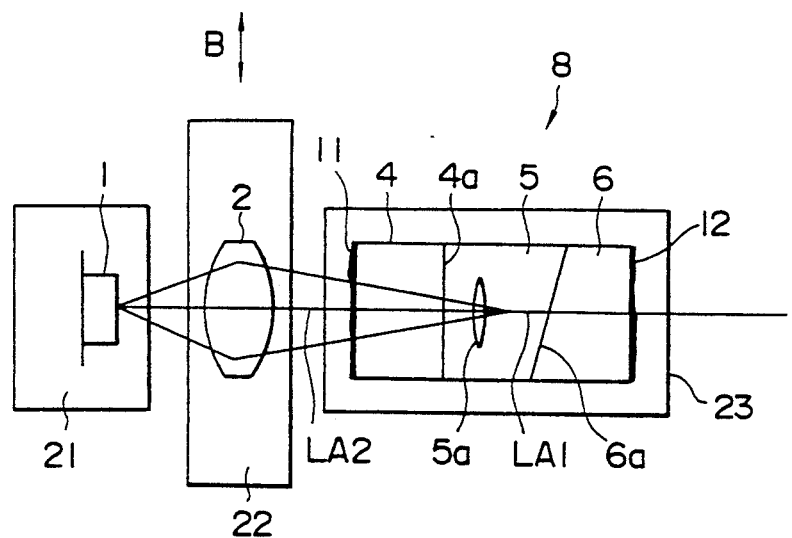
F I G. 4(a)
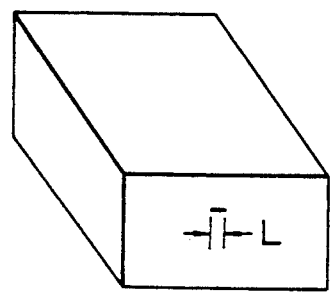
F I G. 4(b)
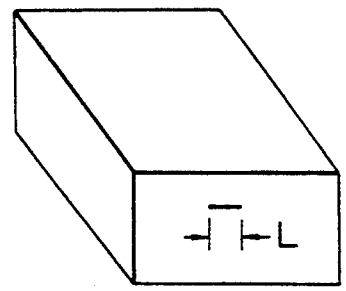

LASER BEAM GENERATING APPARATUS

BACKGROUND OF THE INVENTION

1. Field of the Invention

This invention relates to a laser beam generating apparatus wherein a secondary harmonic laser beam is generated by means of a non-linear optical crystal element.

2. Description of the Prior Art

A laser beam generating apparatus of the type mentioned has already been proposed by the inventor of the present application and is shown in FIG. 1. Referring to FIG. 1, a laser diode 1 such as a semiconductor laser element generates pumping laser beam, which is introduced into a convex lens 2. The pumping laser beam emerging from the lens 2 is introduced into a laser medium 5 by way of a concave mirror 3 and a quarter wavelength plate 4. Upon reception of such pumping laser beam, the laser medium 5, which may be, for example, Nd:YAG, forms a heat lens 5a and generates fundamental wave laser beam. The fundamental wave laser beam is introduced into a plane mirror 7 by way of a non-linear optical crystal element 6 of, for example, KTP. The fundamental wave laser beam is thus reflected by the plane mirror 7 and then introduced into the laser medium 5 again by way of the non-linear optical crystal element 6.

Then, the fundamental wave laser beam emerges in the leftward direction in FIG. 1 from the laser medium 5 and is introduced into the concave mirror 3 by way of the quarter wavelength plate 4. The fundamental wave laser beam is then reflected by the concave mirror 3 and introduced into the laser medium 5 again by way of the quarter wavelength plate 4. In this manner, the fundamental wave laser beam reciprocates between the concave mirror 3 and the plane mirror 7. Thus, an optical resonator 8 is constituted from the concave mirror 3, the quarter wavelength plate 4, the laser medium 5, the non-linear optical crystal element 6 and the plane mirror 7. The position where the fundamental wave laser beam reciprocates is concentrated by an action of the concave mirror 3. Consequently, the energy of the fundamental wave laser beam is amplified so that the KTP (KTiOPO4) generates secondary harmonic laser beam having a frequency equal to twice that of the fundamental wave laser beam due to phase matching of the type II. While the plane mirror 7 reflects almost all of the fundamental wave laser beam, it passes almost all of such secondary harmonic laser beam therethrough. As a result, a secondary harmonic laser beam is outputted from the optical resonator 8. (As regards phase matching of the type II, refer to, for example, U.S. Pat. No. 4,910,740).

The quarter wavelength plate 4, which is a double refracting element, is disposed such that, as seen in FIG. 2, the optical axis ne(4) thereof in the direction of an extraordinary ray may have a directional angle $\theta$ of 45 degrees with respect to the optical axis ne(6) of the non-linear optical crystal element 6 in the direction of an extraordinary ray. Since the directional angle $\theta$ of the quarter wavelength plate 4 is set to 45 degrees in this manner, a coupling phenomenon which may otherwise occur between two modes of the fundamental wave laser beam can be prevented, by which a secondary harmonic laser beam can be stabilized.

An incidence face 6a of the non-linear optical crystal element 6 for the fundamental wave laser beam is formed in an inclined relationship with respect to an optical axis LA1 of the fundamental wave laser beam. Since the incidence face 6a of the non-linear optical crystal element 6 is inclined with respect to the optical axis LA1 in this manner, the effective optical path length of the fundamental wave laser beam can be adjusted accurately to a predetermined value by adjusting the non-linear optical crystal element 6 in a direction perpendicular to the optical axis LA1 of the fundamental wave laser beam, that is, in a direction indicated by a double-sided arrow mark T in FIG. 1. The non-linear optical crystal element 6 is adjusted such that the double refraction amount thereof may be just equal to 90 degrees as a result of such adjustment.

The double refraction amount of the non-linear optical crystal element 6 is adjusted to just 90 degrees in this manner in order to achieve the following advantage. In particular, the fundamental wave laser beam emerging from the laser medium 5 is circularly polarized beam. The fundamental wave laser beam is changed into linearly polarized beam when it passes through the quarter wavelength plate 4. The fundamental wave laser beam in the form of linearly polarized beam is reflected by the concave mirror 3 and then passes through the quarter wavelength plate 4 again, whereupon it is changed back into circularly polarized beam. The fundamental wave laser beam passes through the laser medium 5 and is introduced into the non-linear optical crystal element 6 while it remains in the form of circularly polarized beam. Since the non-linear optical crystal element 6 is adjusted so that the double refraction amount thereof is accurately equal to 90 degrees, the fundamental wave laser beam emerging from the non-linear optical crystal element 6 is linearly polarized beam. The fundamental wave laser beam in the form of linearly polarized beam is reflected by the plane mirror 7 and then passes through the non-linear optical crystal element 6 again, whereupon it is changed back into original circularly polarized beam. In this manner, the fundamental wave laser beam which reciprocates through the laser medium 5 is always in the form of circularly polarized beam, and consequently, a spatial hole burning effect is suppressed by a so-called twist mode effect (Applied Optics, Vol. 4, No. 1, January, 1965).

In the conventional laser beam generating apparatus described above, the double refraction amount of the non-linear optical crystal element 6 is adjusted accurately to 90 degrees by adjusting the non-linear optical crystal element 6 in a direction perpendicular to the optical axis LA1, that is, in a direction of the double-sided arrow mark T in FIG. 1, in this manner. However, a very high degree of accuracy is required for such adjustment. If the orientation of the non-linear optical crystal element 6 is displaced upon such adjustment, then the position of an oscillating region of secondary harmonic laser beam is changed. If such displacement actually occurs, then re-adjustment must be performed beginning with the incidence position of pumping laser beam to the non-linear optical crystal element 6, which is very inefficient.

Besides, the concave mirror 3 is not easy to manufacture and is high in cost.

SUMMARY OF THE INVENTION

It is an object of the present invention to provide a laser beam generating apparatus which is easy to manufacture and simple in adjusting operation.

In order to attain the object, according to an aspect of the present invention, there is provided a laser beam generating apparatus which comprises a light source for generating a pumping laser beam, a laser medium for receiving the pumping laser beam to form a heat lens therein and generate a fundamental wave laser beam, a non-linear optical crystal element for receiving the fundamental wave laser beam to generate a secondary harmonic laser beam from the fundamental wave laser beam, the non-linear optical crystal element having a face inclined with respect to an optical axis of the fundamental wave laser beam, a double refracting element for suppressing coupling between two polarization modes of the fundamental wave laser beam, a pair of planar reflecting means for reflecting the fundamental wave laser light back into the laser medium, the laser medium, the non-linear optical crystal element, the double refracting element and the pair of planar reflecting means cooperating to constitute a light resonator, and adjusting means for adjusting the optical axis of the pumping laser beam in a direction perpendicular to the optical axis.

With the laser beam generating apparatus, pumping laser beam is adjusted in a direction perpendicular to the optical axis thereof. Accordingly, the adjusting operation is simple and easy, and a spatial hole burning effect can be suppressed due to a twist mode effect. Further, since the mirrors constituting a resonator are each formed in a planar profile, it is easy to produce them and the production cost is decreased.

According to another aspect of the present invention, there is provided a laser beam generating apparatus which comprises a light source for generating pumping laser beam, a laser medium for receiving the pumping laser beam to form a heat lens therein and generate fundamental wave laser beam, a non-linear optical crystal element for receiving the fundamental wave laser beam to generate secondary harmonic laser beam from the fundamental wave laser beam, the non-linear optical crystal element having a face inclined with respect to an optical axis of the fundamental wave laser beam, a double refracting element for suppressing coupling between two polarization modes of the fundamental wave laser beam, a pair of planar reflecting means for reflecting the fundamental wave laser beam back into the laser medium, the laser medium, the non-linear optical crystal element, the double refracting element and the pair of planar reflecting means cooperating to constitute a light resonator, and a single base on which the laser medium, non-linear optical crystal system, double refracting element and pair of reflecting means are disposed.

The above and other objects, features and advantages of the present invention will become apparent from the following description and the appended claims, taken in conjunction with the accompanying drawings in which like parts or elements are denoted by like reference characters.

BRIEF DESCRIPTION OF THE DRAWINGS

FIG. 2 is a diagram illustrating a directional angle between a quarter wavelength plate and a non-linear optical crystal element of the conventional laser beam generating apparatus of FIG. 1;

FIG. 3 is a schematic view of a laser beam generating apparatus showing a preferred embodiment of the present invention; and FIGS. 4a and 4b are schematic illustrations showing general construction of laser diodes which may be employed in the laser beam generating apparatus of FIG. 3.

DETAILED DESCRIPTION OF THE PREFERRED EMBODIMENT

Figure 1:
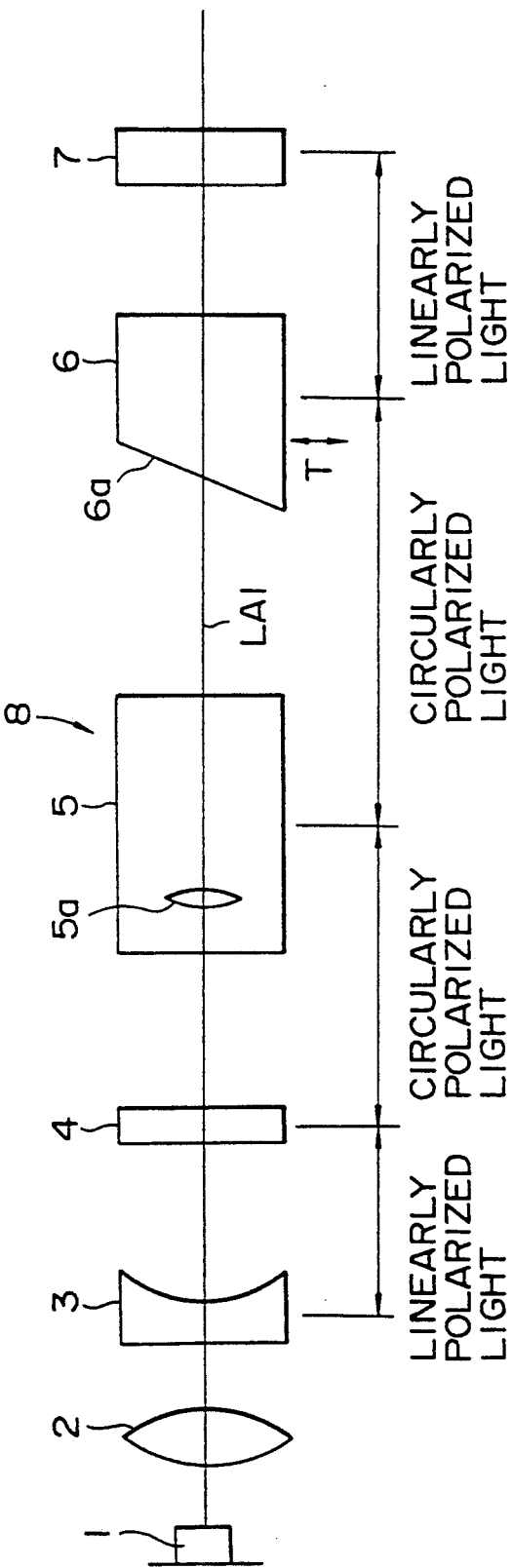
FIG. 1 is a schematic view showing general construction of an exemplary one of conventional laser beam generating apparatus.

Referring to FIG. 3, there is shown a laser beam generating apparatus to which the present invention is applied. The laser beam generating apparatus has generally similar general construction to the conventional laser beam generating apparatus described hereinabove with reference to FIG. 1 and includes a laser diode 1, a convex lens 2, a quarter wavelength plate 4, a laser medium 5 and a non-linear optical crystal element 6, similar to the conventional laser beam generating apparatus. The present laser beam generating apparatus includes a pair of the plane mirrors 11 and 12 in place of the concave mirror 3 and plane mirror 7, respectively. It is to be noted that overlapping description of the common components will be omitted herein to avoid redundancy.

In the present laser beam generating apparatus, the laser diode 1 is placed on a heat sink 21. Meanwhile, the lens 2 is secured to an adjusting plate 22. The adjusting plate 22 is disposed for movement in a direction perpendicular to an optical axis LA2 of pumping laser beam emitted from the laser diode 1, that is, in a direction indicated by a double-sided arrow mark B in FIG. 3.

Meanwhile, the quarter wavelength plate 4, laser medium 5 and non-linear optical crystal element 6 are integrated with each other and secured to a plate 23. A face of the quarter wavelength plate 4 through which pumping laser beam is introduced into the quarter wavelength plate 4 is formed as a flat face. The plane mirror 11, which reflects fundamental wave laser beam, is formed on the face of the quarter wavelength plate 4 by vapor deposition or the like. Similarly, a face of the non-linear optical crystal element 6 through which secondary harmonic laser beam emerges from the non-linear optical crystal element 6 is formed as a flat face. The plane mirror 12 is formed on the face of the non-linear optical crystal element 6 by vapor deposition or the like. An incidence face 6a of the non-linear optical crystal element 6 is formed in an inclined relationship to the optical axis LA1 of the fundamental wave laser beam similarly as in the conventional laser beam generating apparatus of FIG. 1. Further, while a face 4a of the quarter wavelength plate 4 adjacent the laser medium 5 can be made perpendicular to an optical axis LA2, it may be inclined a little in order to prevent otherwise possible composite resonance.

In manufacturing the laser beam generating apparatus, the laser diode 1 is assembled to heat sink 21, and the lens 2 is assembled to the adjusting plate 22. Further, the quarter wavelength plate 4, the laser medium 5 and the non-linear optical crystal element 6 are assembled to the plate 23. After they are assembled in this manner, the heat sink 21, adjusting plate 22 and plate 23 are disposed at predetermined positions. Subsequently, the adjusting plate 22 is adjusted in a direction indicated by the double-sided arrow mark B in FIG. 3 to a position at which the secondary harmonic laser beam outputted from the non-linear optical crystal element 6 presents a highest level, and then it is secured at the position.

When the adjusting plate 22 is moved in the direction of the arrow mark B, the optical axis LA2 of pumping laser beam is moved parallel. Consequently, a position at which a heat lens 5a is formed in the laser medium 5, that is, the optical axis of the fundamental laser beam LA1 in the laser medium 5, is moved parallel in accordance with movement of the optical axis LA2 of the pumping laser beam. As a result, also the position at which the fundamental laser beam LA1 is introduced to the incidence face 6a of the non-linear optical crystal element 6 is varied. Accordingly, the optical path length of the non-linear optical crystal element 6 with respect to the fundamental laser beam is varied. As described hereinabove, the best double refraction amount (phase delay amount) of the non-linear optical crystal element 6 is 90 degrees $((n\pm\frac{1}{4})\lambda$, $\lambda$ is a wavelength). The position at which the optical path length satisfies the condition appears periodically when the adjusting plate 22 is moved in a direction indicated by the arrow mark B. Thus, the adjusting plate 22 or the lens 2 may be disposed at a suitable one of such positions.

In order to allow such adjustment, the plane mirror 11 is essentially formed in a planar profile. In particular, in such a laser beam generating apparatus as shown in FIG. 1 which includes the concave mirror 3 disposed between the lens 2 and the quarter wavelength plate 4, since the pumping laser beam is converged at a single point by the concave mirror 3, the optical axis of the pumping laser beam must necessarily coincide with the optical axis of the concave mirror 3. Or in other words, it is impossible to dispose the optical axis of the pumping laser beam at any arbitrary position. To the contrary, with the laser beam generating apparatus according to the present invention, since the plane mirror 11 is formed in a planar profile, pumping laser beam may be introduced to any arbitrary position of the plane mirror 11.

If the pumping laser beam emitted from the laser diode 1 spreads to a wide area in the laser medium 5, then the energy of fundamental wave laser beam generated by the laser medium 5 will be dispersed and decreased. Therefore, a laser diode having convergency as high as possible should be employed as the laser diode 1. Or in other words, a laser diode having a small beam emitting spot (having an active layer of a small width) should be employed.

For example, if the width L of the active layer of a laser diode ranges from 50 μm to 200 μm as seen in FIG. 4(b), then the power of pumping laser beam obtained from the laser diode may range 200 mw to 1 w. However, when the width is great in this manner, it is difficult to converge the pumping laser beam to a very small spot in the laser medium 5. Therefore, preferably a laser diode wherein the width L of the active layer is several μm or so as shown in FIG. 4(a) is employed. With such laser diode, pumping laser beam having a power ranging from 5 mw to 50 mw can be obtained.

The intensity of the pumping laser beam itself increases as the width of the active layer increases. However, a laser diode having an active layer of a smaller width can converge the pumping laser beam to a smaller spot in the laser medium 5, and accordingly, in order to maximize the level of the fundamental laser beam to be generated from the laser medium 5 and hence the level of secondary harmonic laser beam, the width of the active layer should be minimized.

Meanwhile, the lens 2 should have a high NA (Numerical Aperture) and a low aberration so that a minimum converging spot may be obtained. Further, the wavelength λ of pumping laser beam should be minimized.

Further, the plane mirror 11 cooperates with the heat lens 5a located comparatively near thereto to form a kind of concave mirror. Consequently, the energy level is increased while a resonating operation is repeated.

The laser beam generating apparatus generates secondary harmonic laser beam in the following manner. In particular, the pumping laser beam emitted from the laser diode 1 is introduced into the lens 2. The pumping laser beam is thus converged by the lens 2 to a particular spot in the laser medium 5 by way of the plane mirror 11 and the quarter wavelength plate 4. Consequently, a heat lens 5a is formed in the laser medium 5. Thus, when the pumping laser beam is received, the laser medium 5 generates fundamental wave laser beam. The fundamental wave laser beam is introduced into the non-linear optical crystal element 6 such as a KTP and then reflected by the plane mirror 12. The fundamental wave laser beam thus reflected by the plane mirror 12 passes through the non-linear optical crystal element 6 and is introduced into the laser medium 5 again.

The fundamental wave laser beam emerging in the leftward direction in FIG. 3 from the laser medium 5 passes through the quarter wavelength plate 4 and is reflected by the plane mirror 11. The thus reflected fundamental wave laser beam is introduced into the laser medium 5 again by way of the quarter wavelength plate 4. In this manner, the fundamental wave laser beam reciprocates repetitively between the plane mirror 11 and the other plane mirror 12. Thus, a light resonator 8 is constituted from the plane mirror 11, the quarter wavelength mirror 4, the laser medium 5, the non-linear optical crystal element 6 and the plane mirror 12. The non-linear optical crystal element 6 generates secondary harmonic laser beam of a frequency equal to twice that of the fundamental wave laser beam due to phase matching of the type II. The plane mirror 11 cooperates with the heat lens 5a to form a kind of concave mirror. Thus, the energy level is increased while a resonating operation is repeated, and a secondary harmonic laser beam is outputted through the plane mirror 12 which reflects almost all of the fundamental wave laser beam but passes almost all of the secondary harmonic laser beam therethrough.

Thus, since the fundamental wave laser beam which reciprocates through the laser medium 5 always remains in the form of circularly polarized beam similar to the conventional laser beam generating apparatus described hereinabove with reference to FIG. 1, an otherwise possible spatial hole burning effect is suppressed due to a twist mode effect.

It is to be noted that, while, in the laser beam generating apparatus described above, the adjusting plate 22 is disposed for adjustment in a direction perpendicular to the optical axis LA2 of pumping laser beam, alternatively the laser diode 1 or the heat sink 21 may be disposed for adjustment in a direction perpendicular to the optical axis LA2 of pumping laser beam. Or else, the laser diode 1 and the lens 2 may be integrated with each other and disposed for integral adjustment in a direction perpendicular to the optical axis LA2. Or otherwise, the plate 23 may be disposed for adjustment in a direction perpendicular to the optical axis LA2 while the laser diode 1 and the lens 2 are fixed. In summary, it is only necessary to adjust one of the optical axis LA2 of pumping laser beam and the plate 23 relative to the other.

Having now fully described the invention, it will be apparent to one of ordinary skill in the art that many changes and modifications can be made thereto without departing from the spirit and scope of the invention as set forth herein.

What is claimed is:

1. A laser beam generating apparatus, comprising:
   a light source for generating a pumping laser beam;
   a laser medium for receiving the pumping laser beam to form a heat leans therein and generating a fundamental wave laser beam;
   a non-linear optical crystal element for receiving the fundamental wave laser beam to generate a secondary harmonic laser beam from the fundamental wave laser beam, said non-linear optical crystal element having a face inclined with respect to an optical axis of the fundamental wave laser beam;
   a double refracting element for suppressing coupling between two polarization modes of the fundamental wave laser beam;
   a pair of planar reflecting means for reflecting the fundamental wave laser beam back into said laser medium, said laser medium, said non-linear optical crystal element, said double refracting element and said pair of planar reflecting means cooperating to constitute a light resonator; and
   adjusting means for adjusting the optical axis of the pumping laser beam in a direction perpendicular to the optical axis.

2. A laser beam generating apparatus according to claim 1, wherein said adjusting means adjusts the optical axis of the pumping laser beam in a direction perpendicular to the optical axis of the fundamental wave laser beam emerging from said laser medium such that the double refraction amount by said non-linear optical crystal element is substantially equal to $(n \pm \frac{1}{4})\lambda$, where n is a positive integer and $\lambda$ is a wavelength of the pumping laser beam.

3. A laser beam generating apparatus according to claim 1, further comprising an optical element for converging the pumping laser beam emitted from said light source into said laser medium, said adjusting means adjusting at least one of said light source and said optical element in a direction perpendicular to the optical axis of the fundamental wave laser beam emerging from said laser medium.

4. A laser beam generating apparatus according to claim 1, wherein said laser medium, said non-linear optical crystal element, said double refracting element and said pair of reflecting means are disposed on a single base member, and said adjusting means adjusts the optical axis of the pumping laser beam in a direction perpendicular to the optic axis of the pumping laser beam with respect to said base member.

5. A laser beam generating apparatus according to claim 4, further comprising an optical element for converging the pumping laser beam emitted from said light source into said laser medium, said adjusting means adjusting at least one of said light source and said optical element in a direction perpendicular to the optical axis of the fundamental wave laser beam emerging from said laser medium.

6. A laser beam generating apparatus, comprising:
   a light source for generating pumping laser beam;
   a laser medium for receiving the pumping laser beam to form a heat lens therein and generate fundamental wave laser beam;
   a non-linear optical crystal element for receiving the fundamental wave laser beam to generate secondary harmonic laser beam from the fundamental wave laser beam, said non-linear optical crystal element having a face inclined with respect to an optical axis of the fundamental wave laser beam;
   a double refracting element for suppressing coupling between two polarization modes of the fundamental wave laser beam;
   a pair of planar reflecting means for reflecting the fundamental wave laser beam back into said laser medium, said laser medium, said non-linear optical crystal element, said double refracting element and said pair of planar reflecting means cooperating to constitute a light resonator; and
   a single base on which said laser medium, said non-linear optical crystal system, said double refracting element and said pair of reflecting means are disposed.

7. A laser beam generating apparatus according to claim 6, wherein said double refracting element, said laser medium and said non-linear optical crystal element are disposed in an integral relationship in this order from said light source side on said base, and said laser medium is joined at an inclined face thereof to said non-linear optical crystal element.

8. A laser beam generating apparatus according to claim 6, wherein one of said pair of reflecting means is disposed on a face of said double refracting element adjacent said light source and the other reflecting means is disposed on a face of said nonlinear optical crystal element through which the secondary harmonic laser beam emerges.

9. A laser beam generating apparatus according to claim 6, further comprising adjusting means for adjusting the optical axis of the pumping laser beam in a direction perpendicular to the optical axis.

* * * * *